United States Patent
Sugaya et al.

(10) Patent No.: US 12,126,013 B2
(45) Date of Patent: Oct. 22, 2024

(54) NON-AQUEOUS ELECTROLYTE SECONDARY CELL

(71) Applicants: SANYO Electric Co., Ltd., Daito (JP); Panasonic Corporation, Kadoma (JP)

(72) Inventors: Junichi Sugaya, Osaka (JP); Takuya Shinomiya, Osaka (JP); Takamitsu Tashita, Tokushima (JP); Fumikazu Mizukoshi, Tokushima (JP); Tsukasa Gejo, Osaka (JP)

(73) Assignees: PANASONIC ENERGY CO., LTD., Osaka (JP); PANASONIC HOLDINGS CORPORATION, Osaka (JP)

( * ) Notice: Subject to any disclaimer, the term of this patent is extended or adjusted under 35 U.S.C. 154(b) by 844 days.

(21) Appl. No.: 17/058,865

(22) PCT Filed: Mar. 8, 2019

(86) PCT No.: PCT/JP2019/009257
§ 371 (c)(1),
(2) Date: Nov. 25, 2020

(87) PCT Pub. No.: WO2019/239652
PCT Pub. Date: Dec. 19, 2019

(65) Prior Publication Data
US 2021/0159489 A1    May 27, 2021

(30) Foreign Application Priority Data
Jun. 15, 2018  (JP) .................................. 2018-114169

(51) Int. Cl.
*H01M 4/133*    (2010.01)
*H01M 4/02*    (2006.01)
(Continued)

(52) U.S. Cl.
CPC ........... *H01M 4/364* (2013.01); *H01M 4/133* (2013.01); *H01M 4/134* (2013.01); *H01M 4/386* (2013.01);
(Continued)

(58) Field of Classification Search
CPC ........................ H01M 4/133; H01M 2004/021
See application file for complete search history.

(56) References Cited

U.S. PATENT DOCUMENTS

| | | |
|---|---|---|
| 5,677,082 A | 10/1997 | Greinke et al. |
| 2014/0099555 A1* | 4/2014 | Onizuka .............. H01M 4/0452 29/623.5 |

(Continued)

FOREIGN PATENT DOCUMENTS

| | | |
|---|---|---|
| JP | 9-320600 A | 12/1997 |
| JP | 2011-9203 A | 1/2011 |

(Continued)

OTHER PUBLICATIONS

International Search Report dated Jun. 4, 2019, issued in counterpart International Application No. PCT/JP2019/009257 (2 pages).

(Continued)

*Primary Examiner* — Imran Akram
(74) *Attorney, Agent, or Firm* — WHDA, LLP

(57) ABSTRACT

A non-aqueous electrolyte secondary cell comprising a negative electrode (12) having a negative electrode collector (40) and a negative electrode active material layer (42) provided on the negative electrode collector (40). The negative electrode active material layer (42) contains graphite particles A and graphite particles B as negative electrode active materials. The graphite particles A have an internal void rate of 5% or less. The graphite particles B have an internal void rate of 8 to 20%. When the negative electrode active material layer 42 is halved in the thickness direction, (Continued)

a region 42b on the half closer to the outer surface contains more graphite particles A than a region 42a on the half closer to the negative electrode collector.

6 Claims, 2 Drawing Sheets

(51) Int. Cl.
*H01M 4/134* (2010.01)
*H01M 4/36* (2006.01)
*H01M 4/38* (2006.01)
*H01M 4/587* (2010.01)
*H01M 10/0525* (2010.01)

(52) U.S. Cl.
CPC ....... *H01M 4/587* (2013.01); *H01M 10/0525* (2013.01); *H01M 2004/021* (2013.01); *H01M 2004/027* (2013.01)

(56) References Cited

U.S. PATENT DOCUMENTS

| | | | | |
|---|---|---|---|---|
| 2014/0377637 | A1* | 12/2014 | Kim | H01M 4/131 429/235 |
| 2015/0280221 | A1* | 10/2015 | Abdelsalam | H01M 4/0404 429/232 |
| 2018/0026267 | A1* | 1/2018 | Kim | C01G 53/50 429/223 |
| 2018/0026268 | A1* | 1/2018 | Kim | C01G 53/006 429/223 |
| 2018/0190985 | A1 | 7/2018 | Choi et al. | |
| 2018/0309162 | A1* | 10/2018 | Jung | H01M 4/661 |

FOREIGN PATENT DOCUMENTS

| | | |
|---|---|---|
| JP | 2011-181427 A | 9/2011 |
| JP | 2012-216537 A | 11/2012 |
| JP | 2014-67638 A | 4/2014 |
| JP | 2018-55952 A | 4/2018 |
| JP | 2018-523912 A | 8/2018 |
| WO | 2017/111542 A1 | 6/2017 |
| WO | 2020/175361 A1 | 9/2020 |

OTHER PUBLICATIONS

The Extended European Search Report dated Jun. 28, 2021, issued in counterpart EP Application No. 19818967.2. (9 pages).

* cited by examiner

NON-AQUEOUS ELECTROLYTE SECONDARY CELL

TECHNICAL FIELD

The present invention relates to a non-aqueous electrolyte secondary battery.

BACKGROUND ART

A non-aqueous electrolyte secondary battery using a carbon material as a negative electrode active material is widely used as a secondary battery high in energy density.

For example, Patent Literature 1 discloses a non-aqueous electrolyte secondary battery with, as a carbon material, densified carbon having a porosity due to closed pores of 5% or less.

For example, Patent Literature 2 discloses a non-aqueous electrolyte secondary battery with, as a carbon material, a carbon material including a carbon material A having a porosity due to closed pores of 1% or more and less than 23% and a carbon material B having a porosity due to closed pores of 23% or more and 40% or less.

CITATION LIST

Patent Literature

PATENT LITERATURE 1: Japanese Unexamined Patent Application Publication No. H9-320600
PATENT LITERATURE 2: Japanese Unexamined Patent Application Publication No. 2014-67638

SUMMARY

However, a problem of conventional non-aqueous electrolyte secondary batteries is that the battery capacity is reduced when a rapid charge cycle is performed in which charge at a high rate in a short time and discharge at a lower rate for a longer time are performed. In particular, a non-aqueous electrolyte secondary battery, when used in a power source for electric vehicles (EV) or the like, is often charged at a high rate in a short time and thus is required to be suppressed in deterioration in rapid charge cycle characteristics.

Therefore, it is an advantage of the present disclosure to provide a non-aqueous electrolyte secondary battery that may be suppressed in deterioration in rapid charge cycle characteristics.

A non-aqueous electrolyte secondary battery of one aspect of the present disclosure comprises a negative electrode including a negative electrode current collector and a negative electrode active material layer disposed on the negative electrode current collector, the negative electrode active material layer includes graphite particles A and graphite particles B each as a negative electrode active material, the graphite particles A have a porosity due to closed pores of 5% or less and the graphite particles B have a porosity due to closed pores of 8% to 20%, and the graphite particles A are more included in a half region on an outer surface side than in a half region on a negative electrode current collector side in the case of bisection of the negative electrode active material layer in a thickness direction.

According to one aspect of the present disclosure, a non-aqueous electrolyte secondary battery can be provided that can be suppressed in deterioration in rapid charge cycle characteristics.

Figure 1:
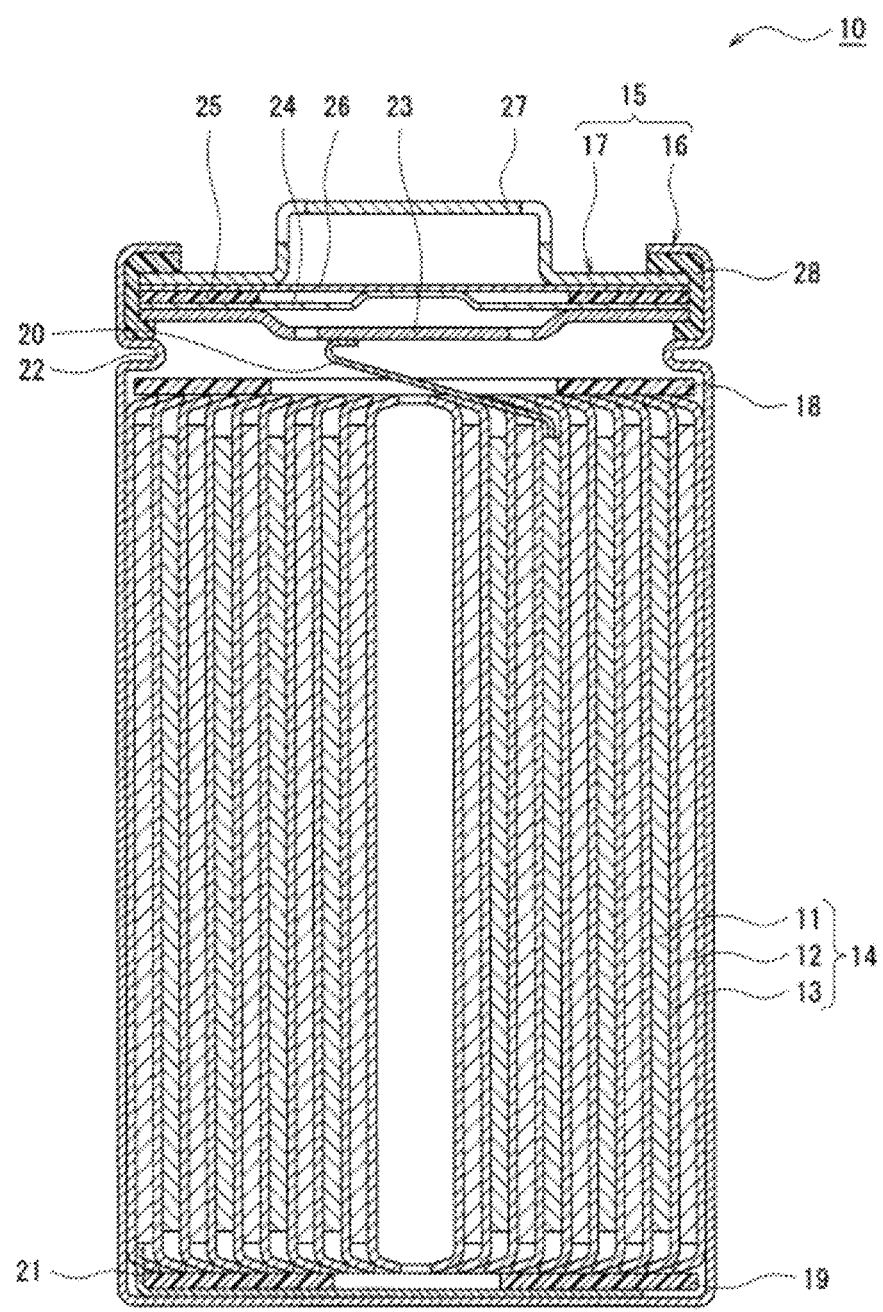
FIG. 1 is a sectional view of a non-aqueous electrolyte secondary battery of an exemplary embodiment.

DESCRIPTION OF EMBODIMENTS (Underlying Knowledge Forming Basis of the Present Disclosure)

Graphite particles low in porosity due to closed pores allow for suppression of breakage of graphite particles in a charge-discharge cycle and suppression of a decomposition reaction or the like of a non-aqueous electrolyte, which occurs according to such breakage, as compared with graphite particles high in porosity due to closed pores, and therefore tend to allow for suppression of deterioration in charge-discharge cycle characteristics of a non-aqueous electrolyte secondary battery. While a negative electrode current collector and graphite particles disposed thereon, which constitute a negative electrode, are bound by a binder or the like, such graphite particles, if low in porosity due to closed pores, hardly collapse in formation of an electrode, and cause bindability between the negative electrode current collector and such graphite particles to be easily deteriorated. Thus, such graphite particles are easily peeled from the negative electrode current collector under severe conditions as in rapid charge, and therefore the above-mentioned deterioration in rapid charge cycle characteristics cannot be sometimes effectively suppressed by simple use of graphite particles low in porosity due to closed pores. The present inventors have then made intensive studies, as a result, have found that graphite particles low in porosity due to closed pores are required to be more disposed on an outer surface side than on a negative electrode current collector side in a negative electrode active material layer including graphite particles low in porosity due to closed pores and graphite particles high in porosity due to closed pores, in order to suppress deterioration in rapid charge cycle characteristics, and thus have conceived each non-aqueous electrolyte secondary battery shown in the following aspects.

A non-aqueous electrolyte secondary battery of one aspect of the present disclosure comprises a negative electrode including a negative electrode current collector and a negative electrode active material layer disposed on the negative electrode current collector, the negative electrode active material layer includes graphite particles A and graphite particles B each as a negative electrode active material, the graphite particles A have a porosity due to closed pores of 5% or less and the graphite particles B have a porosity due to closed pores of 8% to 20%, and the graphite particles A are more included in a half region on an outer surface side than in a half region on a negative electrode current collector side in the case of bisection of the negative electrode active material layer in a thickness direction.

While the above-mentioned decomposition reaction of a non-aqueous electrolyte occurs on the surface of a negative electrode, a non-aqueous electrolyte secondary battery of one aspect of the present disclosure is considered to be effectively suppressed in such a decomposition reaction of a non-aqueous electrolyte even under severe conditions as in rapid charge because the graphite particles A having a porosity due to closed pores of 5% or less are more included in the half region of the negative electrode active material layer on the outer surface side than in the half region of the negative electrode active material layer on the negative electrode current collector side. On the other hand, the graphite particles A having a porosity due to closed pores of 5% or less are less included in the half region of the negative electrode active material layer on the negative electrode current collector side (consequently, graphite particles B that properly collapse in electrode formation are more included), and thus adhesiveness between the negative electrode current collector and graphite particles is ensured and such graphite particles are hardly peeled from the negative electrode current collector even under severe conditions as in rapid charge. Therefore, such a non-aqueous electrolyte secondary battery of one aspect of the present disclosure is suppressed in deterioration in rapid charge cycle characteristics.

Hereinafter, an exemplary embodiment will be described in detail with reference to drawings. The non-aqueous electrolyte secondary battery of the present disclosure is not limited to embodiments described below. The drawings referred to in the description of embodiments are schematically illustrated.

FIG. 1 is a sectional view of a non-aqueous electrolyte secondary battery of an exemplary embodiment. A non-aqueous electrolyte secondary battery 10 shown in FIG. 1 comprises a wound-type electrode assembly 14 formed by winding a positive electrode 11 and a negative electrode 12 with a separator 13 interposed therebetween, a non-aqueous electrolyte, insulating plates 18 and 19 respectively disposed above and below the electrode assembly 14, and a battery case 15 that houses such members. The battery case 15 is configured by a cylindrical case body 16 having a closed-end, and a sealing assembly 17 for closing the opening of the case body 16. Another form of electrode assembly, for example, a stacked electrode assembly formed by stacking alternately a positive electrode and a negative electrode with a separator interposed therebetween may be here applied instead of the wound-type electrode assembly 14. Examples of the battery case 15 can include a cylindrical, rectangular, coin-shaped, or button-shaped metal exterior can, and a pouch exterior body formed by laminating a resin sheet and a metal sheet.

The case body 16 is, for example, a cylindrical metal exterior can having a closed-end. A gasket 28 is disposed between the case body 16 and the sealing assembly 17 to ensure that the interior of the battery is tightly sealed. The case body 16 includes, for example, a projecting portion 22 which has a portion of a lateral surface projected inward and which supports the sealing assembly 17. The projecting portion 22 is preferably formed annularly along the circumferential direction of the case body 16, and the upper surface thereof supports the sealing assembly 17.

The sealing assembly 17 has a structure in which a filter 23, a lower vent member 24, an insulating member 25, an upper vent member 26, and a cap 27 are stacked in the Listed order sequentially from the electrode assembly 14 side. Each of the members constituting the sealing assembly 17 has, for example, a disk or ring shape, and the members other than the insulating member 25 are electrically connected to each other. The lower vent member 24 and the upper vent member 26 are connected to each other at respective middle portions and the insulating member 25 is interposed between respective circumferences. If the internal pressure of the non-aqueous electrolyte secondary battery 10 increases by heat generation due to, for example, internal short, the lower vent member 24 changes its shape in such a way as to, for example, push up the upper vent member 26 toward the cap 27, and thus ruptures, thereby breaking the electrical connection between the lower vent member 24 and the upper vent member 26. If the internal pressure further increases, the upper vent member 26 ruptures to discharge gas through the opening of the cap 27.

In the non-aqueous electrolyte secondary battery 10 shown in FIG. 1, a positive electrode lead 20 attached to the positive electrode 11 passes through a though-hole in the insulating plate 18 and extends toward the sealing assembly 17, and a negative electrode lead 21 attached to the negative electrode 12 passes on the outside of the insulating plate 19 and extends toward the bottom of the case body 16. The positive electrode lead 20 is connected to the lower surface of the filter 23, which is the bottom board of the sealing assembly 17, by welding or the like, and the cap 27, which is the top board of the sealing assembly 17 and electrically connected to the filter 23, serves as a positive electrode terminal. The negative electrode lead 21 is connected to the inner surface of the bottom of the case body 16 by welding or the like, and the case body 16 serves as a negative electrode terminal.

Hereinafter, each component of the non-aqueous electrolyte secondary battery 10 will be described in detail.

[Negative Electrode]

Figure 2:
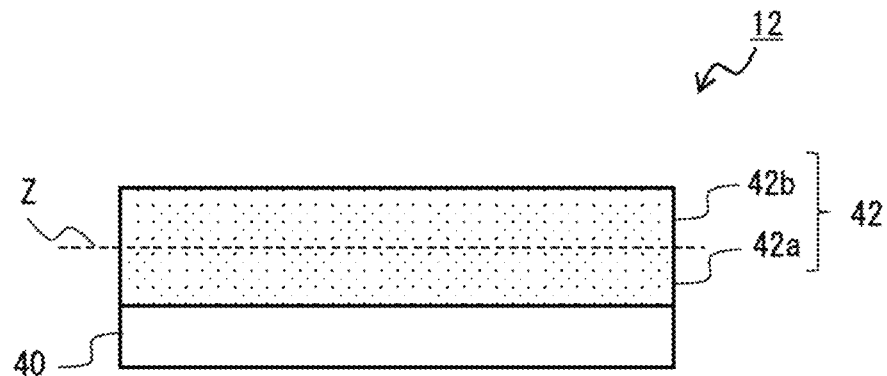
FIG. 2 is a sectional view of a negative electrode of an exemplary embodiment.

FIG. 2 is a sectional view of a negative electrode of an exemplary embodiment. The negative electrode 12 includes a negative electrode current collector 40 and a negative electrode active material layer 42 disposed on the negative electrode current collector 40.

The negative electrode current collector 40 here used is, for example, foil of a metal, such as copper, which is stable in the electric potential range of the negative electrode, or a film in which such a metal is disposed on an outer layer.

The negative electrode active material layer 42 includes graphite particles as a negative electrode active material. The negative electrode active material layer 42 preferably includes, for example, a binder. The negative electrode 12 can be produced by, for example, preparing a negative electrode mixture slurry including a negative electrode active material, a binder, and the like, coating the negative electrode current collector 40 with the negative electrode mixture slurry and drying the resultant to thereby form the negative electrode active material layer 42, and rolling the negative electrode active material layer 42. The detail of the method for producing the negative electrode active material layer 42 will be described below.

Figure 3:
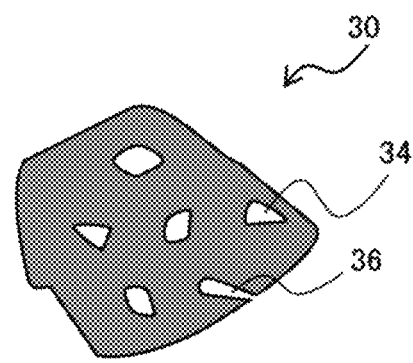
FIG. 3 is a sectional view of a graphite particle in a negative electrode active material layer.

FIG. 3 is a sectional view of a graphite particle in a negative electrode active material layer. As shown in FIG. 3, a graphite particle 30 has closed pores 34 (hereinafter, closed pores 34) not linked from the internal of the particle to the surface of the particle and pores 36 (hereinafter, open pores 36) linked from the internal of the particle to the surface of the particle, when the cross section of the graphite particle 30 is viewed.

Such graphite particles 30 in the present embodiment include graphite particles A having a porosity due to closed pores of 5% or less and graphite particles B having a porosity due to closed pores of 8% to 20%. The graphite particles A may have a porosity due to closed pores of 5% or less, preferably 1% to 5%, more preferably 3% to 5% in view of, for example, suppression of deterioration in rapid charge cycle characteristics. The graphite particles B may have a porosity due to closed pores of 8% to 20%, preferably 10% to 18%, more preferably 12% to 16% in view of, for example, suppression of deterioration in rapid charge cycle characteristics. Such respective internal porosities of the graphite particles are two dimensional values each determined from the percentage of the area of the closed pores 34 of the graphite particle to the cross sectional area of the graphite particle. Such respective internal porosities of the graphite particles are each determined by the following procedure.

<Method for Measuring Porosity Due to Closed Pores>

(1) The cross section of the negative electrode active material layer is exposed. Examples of the method for exposing the cross section include a method involving cutting out a portion of the negative electrode and processing the resultant with an ion milling apparatus (for example, IM4000PLUS manufactured by Hitachi High-Tech Corporation) to expose the cross section of the negative electrode active material layer.

(2) A reflection electron image of the cross section exposed of the negative electrode active material layer is taken with a scanning electron microscope. The magnification in taking of the reflection electron image is from 3000× to 5000×.

(3) The cross section image obtained as described above is imported into a computer and binarized with image analysis software (for example, ImageJ manufactured by National Institutes of Health), thereby obtaining an image binarized, in which the cross section of each particle in the cross section image is converted into a black image and any pore present in the cross section of such each particle is converted into a white image.

(4) Any graphite particles A and B each having a particle size of 5 μm to 50 μm are selected in the image binarized, and the area of the cross section of each of the graphite particles, and the area of each of the closed pores present in the cross section of each of the graphite particles are calculated. The area of the cross section of each of the graphite particles here refers to the area of the region surrounded by the circumference of each of the graphite particles, namely, the area of the entire cross section part of such each of the graphite particles. Any pore having a width of 3 μm or less, among pores present in the cross sections of the graphite particles, may sometimes have a difficulty in determining whether such any pore is a closed pore or an open pore in image analysis, and thus such any pore having a width of 3 μm or less may be defined as a closed pore. Each of the internal porosities of the graphite particles (area of closed pore in cross section of each graphite particle×100/area of cross section of each graphite particle) is calculated from the area of the cross section of each of the graphite particles and the area of each of the closed pores in the cross section of each of the graphite particles, calculated. The internal porosities of the graphite particles A and B are average values with respect to ten graphite particles A and ten graphite particles B, respectively.

The graphite particles A and B are produced as follows, for example.

<Graphite Particles A (Porosity Due to Closed Pores: 5% or Less)>

The graphite particles A having a desired size are obtained by, for example, pulverizing coke (precursor) serving as a main raw material, to a predetermined size, firing and graphitizing such a precursor pulverized, which is aggregated by a binder, at a temperature of 2600° C. or more, and then sieving the resultant. The porosity due to closed pores can be here adjusted to 5% or less by the particle size of the precursor pulverized, the particle size of the precursor aggregated, and/or the like. For example, the average particle size (median size D50 on a volume basis) of the precursor pulverized is preferably in the range from 12 μm to 20 μm. When the porosity due to closed pores is decreased in the range of 5% or less, the particle size of the precursor pulverized is preferably increased.

<Graphite Particles B (Porosity Due to Closed Pores: 8% to 20%)>

The graphite particles B having a desired size are obtained by, for example, pulverizing coke (precursor) serving as a main raw material, to a predetermined size, firing and graphitizing such a precursor pulverized, which is aggregated by a binder and then further pressure molded into a block, at a temperature of 2600° C. or more, and pulverizing and sieving a block molded product graphitized. The porosity due to closed pores can be here adjusted to 8% to 20% by the amount of a volatile component added to the block molded product. When a portion of the binder added to the coke (precursor) volatilizes in firing, the binder can be used as a volatile component. Examples of such a binder include pitch.

The graphite particles A and B for use in the present embodiment are, for example, natural graphite or artificial graphite without any particular limitation, and are preferably artificial graphite in view of, for example, easiness of adjustment of the porosity due to closed pores. The plane spacing ($d_{002}$) of the (002) plane with respect to the graphite particles A and B for use in the present embodiment, according to a wide-angle X-ray diffraction method, is, for example, preferably 0.3354 urn or more, more preferably 0.3357 nm or more, and preferably less than 0.340 nm, more preferably 0.338 nm or less. The crystallite size ($Lc(002)$) with respect to the graphite particles A and B for use in the present embodiment, as determined according to an X-ray diffraction method, is, for example, preferably 5 nm or more, more preferably 10 nm or more, and preferably 300 nm or less, more preferably 200 nm or less. When the plane spacing ($d_{002}$) and the crystallite size ($Lc(002)$) satisfy the above respective ranges, the battery capacity of the non-aqueous electrolyte secondary battery tends to increase as compared with when the above respective ranges are not satisfied. Herein, at least a portion of the surfaces of the graphite particles A is preferably covered with amorphous carbon. Thus, low-temperature characteristics of the non-aqueous electrolyte secondary battery are enhanced.

In the present embodiment, the graphite particles A are more included in a half region 42b on the outer surface side than in a half region 42a on the negative electrode current collector side in the case of bisection of the negative electrode active material layer 42 shown in FIG. 2 in the thickness direction. Thus, for example, decomposition of a non-aqueous electrolyte is suppressed and furthermore the graphite particles are hardly peeled from the negative electrode current collector 40 in a rapid charge cycle, and therefore deterioration in rapid charge cycle characteristics is suppressed. Herein, the bisection of the negative electrode active material layer 42 in the thickness direction means division into halves at the midpoint Z of the thickness of the negative electrode active material layer 42 under the assumption that the direction of stacking of the negative electrode current collector 40 and the negative electrode active material layer 42 is the thickness direction of the negative electrode active material layer 42. Any negative electrode active material layer 42 located closer when viewed from the negative electrode current collector 40 and any negative electrode active material layer 42 located farther when viewed from the negative electrode current collector 40, in the bisection of the negative electrode active material layer 42 in the thickness direction, are defined as the half region 42a on the negative electrode current collector side and the half region 42b on the outer surface side, respectively.

In the present embodiment, the graphite particles A may be more included in the half region 42b on the outer surface side than in the half region 42a on the negative electrode current collector side, and furthermore the mass ratio between the graphite particles A and the graphite particles B in the half region 42b on the outer surface side is preferably 20:80 to 100:0, more preferably 50:50 to 100:0 in view of suppression of deterioration in rapid charge cycle characteristics. Furthermore, the mass ratio between the graphite particles A and the graphite particles B in the half region 42a on the negative electrode current collector side is preferably 10:90 to 0:100, more preferably 0:100 in view of more suppression of deterioration in rapid charge-discharge cycle characteristics.

A specific method for allowing the amount of the graphite particles A to be larger in the half region 42b on the outer surface side than in the half region 42a on the negative electrode current collector side is described. For example, first, a negative electrode active material including the graphite particles B (if necessary, graphite particles A), a binder, and a solvent such as water are mixed to prepare a negative electrode mixture slurry for use on the negative electrode current collector side. A negative electrode active material including a larger amount of the graphite particles A (if necessary, graphite particles B) than that in the negative electrode mixture slurry for use on the negative electrode current collector side, a binder, and a solvent such as water are mixed to separately prepare a negative electrode mixture slurry for use on the outer surface side. Both sides of the negative electrode current collector can be coated with the negative electrode mixture slurry for use on the negative electrode current collector side, the resultant coatings can be dried, thereafter both sides of a coating of the negative electrode mixture slurry for use on the negative electrode current collector side can be coated with the negative electrode mixture slurry for use on the outer surface side, and the resultant coatings can be dried, to thereby form the negative electrode active material layer 42. The method, while involves coating with the negative electrode mixture slurry for use on the outer surface side after coating with the negative electrode mixture slimy for use on the negative electrode current collector side, and drying, may be a method involving coating with the negative electrode mixture slurry for use on the outer surface side after coating with the negative electrode mixture slurry for use on the negative electrode current collector side and before drying.

The negative electrode active material may include other material that can reversibly intercalate and deintercalate lithium ions, other than the graphite particles A and B for use in the present embodiment, and may include, for example, a Si material. Examples of the Si material include Si, an alloy including Si, and silicon oxide such as $SiO_X$ (X is 0.8 to 1.6). The Si material, although is a negative electrode material that can more enhance battery capacity than graphite particles, is large in volume expansion along with charge and discharge and thus is disadvantageous in view of rapid charge cycle characteristics. However, a case where the amount of the graphite particles A is larger in the half region on the outer surface side than in the half region on the negative electrode current collector side in a negative electrode active material layer including a negative electrode active material including the graphite particles A and B and the Si material can effectively suppress deterioration in rapid charge cycle characteristics as compared with when the graphite particles A are uniformly dispersed in the negative electrode active material layer. The content of the Si material is, for example, preferably 1 mass % to 10 mass %, more preferably 3 mass % to 7 mass % based on the mass of the negative electrode active material in view of, for example, an enhancement in battery capacity and suppression of deterioration in rapid charge cycle characteristics.

Examples of such other material that can reversibly intercalate and deintercalate lithium ions include a metal to be alloyed with lithium, such as tin (Sn), or an alloy or oxide including a metal element such as Sn. The negative electrode active material may include such other material, and the content of such other material is, for example, 10 mass % or less based on the mass of the negative electrode active material.

Examples of the binder include fluoro resins, PAN, polyimide resins, acrylic resins, polyolefin resins, styrene-butadiene rubber (SBR), nitrile-butadiene rubber (NBR), carboxymethyl cellulose (CMC) or salts thereof, poly(acrylic acid) (PAA) or salts thereof (PAA-Na, PAA-K, and the like which may be partially neutralized salts), and poly(vinyl alcohol) (PVA). These may be used singly or may be used in combinations of two or more thereof.

[Positive Electrode]

The positive electrode 11 is configured from, for example, a positive electrode current collector of metal foil or the like, and a positive electrode active material layer formed on the positive electrode current collector. The positive electrode current collector here used can be, for example, foil of a metal, such as aluminum, which is stable in the electric potential range of the positive electrode, or a film in which such a metal is disposed on an outer layer. The positive electrode active material layer includes, for example, a positive electrode active material, a binder, and a conductive agent.

The positive electrode 11 can be produced by, for example, coating the positive electrode current collector with a positive electrode mixture slurry including, for example, a positive electrode active material, a binder, and a conductive agent, and drying the resultant to thereby form the positive electrode active material layer, and then rolling the positive electrode active material layer.

Examples of the positive electrode active material can include a lithium/transition metal oxide containing a transition metal element such as Co, Mn, or Ni. Examples of the lithium/transition metal oxide include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}Mn_yO_z$, $Li_xMn_2O_4$, $Li_xMn_{2-y}M_yO_4$, $LiMPO_4$, or $Li_2MPO_4F$ (M; at least one of Na, Mg, Sc, Y, Mn, Fe, Co, Ni, Cu, Zn, Al, Cr, Pb, Sb, and B, $0<x\leq1.2$, $0<y\leq0.9$, $2.0\leq z\leq2.3$). These may be used singly or a plurality thereof may be mixed and used. The positive electrode active material preferably includes a lithium/nickel complex oxide such as $Li_xNiO_2$, $Li_xCo_yNi_{1-y}O_2$, or $Li_xNi_{1-y}M_yO_z$ (M; at least one of Na, Mg, Sc, Y, Mn, Fe, Co, Ni, Cu, Zn, Al, Cr, Pb, Sb, and B, $0<x\leq1.2$, $0<y\leq0.9$, $2.0\leq z\leq2.3$) from the viewpoint that the capacity of the non-aqueous electrolyte secondary battery can be increased.

Examples of the conductive agent include carbon particles such as carbon black (CB), acetylene black (AB), Ketjenblack, and graphite. These may be used singly or may be used in combinations of two or more thereof.

Examples of the binder include fluoro resins such as polytetrafluoroethylene (PTFE) and poly(vinylidene fluoride) (PVdF), polyacrylonitrile (PAN), polyimide resins, acrylic resins, and polyolefin resins. These may be used singly or may be used in combinations of two or more thereof

[Separator]

For example, an ion-permeable and insulating porous sheet is used as the separator 13. Specific examples of the porous sheet include a microporous thin film, woven fabric, and nonwoven fabric. Suitable examples of the material for the separator include olefin resins such as polyethylene and polypropylene, and cellulose. The separator 13 may be a laminate including a cellulose fiber layer and a layer of fibers of a thermoplastic resin such as an olefin resin. The separator may be a multi-layered separator including a polyethylene layer and a polypropylene layer, and a surface of a separator to be used may be coated with a material such as an aramid resin or ceramic.

[Non-Aqueous Electrolyte]

The non-aqueous electrolyte includes a non-aqueous solvent and an electrolyte salt dissolved in the non-aqueous solvent. The non-aqueous electrolyte is not limited to a liquid electrolyte (electrolyte solution), and may be a solid electrolyte using a gel polymer or the like. Examples of the non-aqueous solvent that can be used include esters, ethers, nitriles such as acetonitrile, amides such as dimethylformamide, and any mixed solvent of two or more thereof. The non-aqueous solvent may contain a halogen-substituted product formed by replacing at least a portion of hydrogen of any of the above solvents with a halogen atom such as fluorine.

Examples of the esters include cyclic carbonate esters such as ethylene carbonate (EC), propylene carbonate (PC), and butylene carbonate, chain carbonate esters such as dimethyl carbonate (DMC), ethyl methyl carbonate (EMC), diethyl carbonate (DEC), methyl propyl carbonate, ethyl propyl carbonate, and methyl isopropyl carbonate, cyclic carboxylate esters such as γ-butyrolactone and γ-valerolactone, and chain carboxylate esters such as methyl acetate, ethyl acetate, propyl acetate, methyl propionate (MP), and ethyl propionate.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ethers, and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, di phenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

Preferable examples of the halogen-substituted product for use include a fluorinated cyclic carbonate ester such as fluoroethylene carbonate (FEC), a fluorinated chain carbonate ester, and a fluorinated chain carboxylate ester such as methyl fluoropropionate (FMP).

The electrolyte salt is preferably a lithium salt. Examples of the lithium salt include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(C_nF_{2n+1})_x$ (where 1<x<6, and n is 1 or 2), $LiB_{10}Cl_{10}$, $LiCl$, $LiBr$, $LiI$, chloroborane lithium, lithium lower aliphatic carboxylate, borate salts such as $Li_2B_4O_7$ and $Li(B(C_2O_4)F_2)$, and imide salts such as $LiN(SO_2CF_3)_2$ and $LiN(C_lF_{2l+1}SO_2)(C_mF_{2m+1}SO_2)$ {where l and m are integers of 1 or more}. These lithium salts may be used singly or a plurality thereof may be mixed and used. Among these, $LiPF_6$ is preferably used in view of ionic conductivity, electrochemical stability, and other properties. The concentration of the lithium salt is preferably 0.8 to 1.8 mol per liter of the solvent.

EXAMPLES

Hereinafter, the present disclosure will be further described with reference to Examples, but the present disclosure is not intended to be limited to such Examples.

Example 1

[Production of Positive Electrode]

Nickel/lithium cobaltite with aluminum ($LiNi_{0.88}Co_{0.09}Al_{0.03}O_2$) was used as a positive electrode active material. Mixed were 100 parts by mass of the positive electrode active material, 1 part by mass of graphite as a conductive agent, and 0.9 parts by mass of a poly (vinylidene fluoride) powder as a binder, and an appropriate amount of N-methyl-2-pyrrolidone (NMP) was further added thereto to prepare a positive electrode mixture slurry. Both sides of a positive electrode current collector made of aluminum foil (thickness 15 μm) were coated with the slurry by a doctor blade method, and the resultant coatings were dried and then rolled by a roller to thereby produce a positive electrode in which a positive electrode active material layer was formed on each of both sides of the positive electrode current collector.

[Production of Graphite Particles A]

Coke was pulverized until the average particle size (median size D50) reached 12 μm. Pitch as a binder was added to the coke pulverized, and the coke was aggregated until the average particle size (median size D50) reached 17 μm. After such an aggregate was fired and graphitized at a temperature of 2800° C., the resultant was sieved using a 250-mesh sieve, to thereby obtain graphite particles A having an average particle size (median size D50) of 23 μm.

[Production of Graphite Particles B]

Coke was pulverized until the average particle size (median size D50) reached 15 μm, pitch as a binder was added to the coke pulverized, the resultant was aggregated, and furthermore a block molded product having a density of 1.6 $g/cm^3$ to 1.9 $g/cm^3$ was then produced at isotropic pressure. The block molded product was fired and graphitized at a temperature of 2800° C. Then, the block molded product graphitized was sieved using a 250-mesh sieve, to thereby obtain graphite particles B having an average particle size (median size D50) of 23 μm.

[Production of Negative Electrode]

Mixed were 95 parts by mass of graphite particles A and 5 parts by mass of SiO, and the resulting mixture was adopted as negative electrode active material A to be included in the half region of the negative electrode active material layer on the outer surface side. Negative electrode active material A, carboxymethyl cellulose (CMC), and styrene-butadiene copolymer rubber (SBR) were mixed such that the mass ratio thereof was 100:1:1, to thereby prepare a negative electrode mixture slurry for use on the outer surface side. Mixed were 95 parts by mass of graphite particles B and 5 parts by mass of SiO, and the resulting mixture was adopted as negative electrode active material B to be included in the half region of the negative electrode active material layer on the negative electrode current collector side. Negative electrode active material B, carboxymethyl cellulose (CMC), and styrene-butadiene copolymer rubber (SBR) were mixed such that the mass ratio thereof was 100:1:1, to thereby prepare a negative electrode mixture slurry for use on the negative electrode current collector side.

After both sides of a negative electrode current collector made of copper foil were coated with the negative electrode mixture slimy for use on the negative electrode current collector, by a doctor blade method, and the resulting coatings were dried, the coatings were coated with the negative electrode mixture slurry for use on the outer surface side, the resultant coatings were dried, and the coatings were then rolled by a roller to thereby produce a negative electrode in which a negative electrode active material layer was formed on each of both sides of the negative electrode current collector. In other words, the mass ratio of graphite particles A:graphite particles B in the half region of the negative electrode active material layer on the outer surface side was 100:0, and the mass ratio of graphite particles A:graphite particles B in the half region of the negative electrode active material layer on the negative electrode current collector side was 0:100. The internal porosities of the graphite particles A and B in the negative electrode produced were measured, and were 3% and 15%, respectively. The measurement method was as described above, and thus the description thereof was omitted.

[Production of Non-Aqueous Electrolyte]

Five parts by mass of vinylene carbonate (VC) was added to a non-aqueous solvent obtained by mixing ethylene carbonate (EC) and dimethyl carbonate (DMC) in a volume ratio of 1:3, and $LiPF_6$ was dissolved therein at a concentration of 1.5 mol/L. The resultant was adopted as a non-aqueous electrolyte.

[Production of Non-Aqueous Electrolyte Secondary Battery]

(1) After a positive electrode lead was attached to the positive electrode current collector and a negative electrode lead was attached to the negative electrode current collector, the resultant was wound with a separator including a microporous film made of polyethylene interposed between the positive electrode and the negative electrode, to thereby produce a wound-type electrode assembly.

(2) Respective insulating plates were disposed on and under the electrode assembly, and the negative electrode lead was welded to a case body and the positive electrode lead was welded to a sealing assembly, to thereby house the electrode assembly in the case body.

(3) After the non-aqueous electrolyte was injected into the case body with a reduced pressure system, the opening of the case body was sealed by the sealing assembly via a gasket. The resultant was adopted as a non-aqueous electrolyte secondary battery.

Example 2

A negative electrode was produced in the same manner as in Example 1 except that 95 parts by mass of graphite particles including 50 parts by mass of graphite particles A and 50 parts by mass of graphite particles B, and 5 parts by mass of SiO were mixed and the resulting mixture was used as negative electrode active material A. In other words, the mass ratio of graphite particles A:graphite particles B in the half region of the negative electrode active material layer on the outer surface side was 50:50, and the mass ratio of graphite particles A:graphite particles B in the half region of the negative electrode active material layer on the negative electrode current collector side was 0:100.

A non-aqueous electrolyte secondary battery was produced using the resulting negative electrode of Example 2 in the same manner as in Example 1.

Example 3

A negative electrode was produced in the same manner as in Example 1 except that 95 parts by mass of graphite particles including 80 parts by mass of graphite particles A and 20 parts by mass of graphite particles B, and 5 parts by mass of Si were mixed and the resulting mixture was used as negative electrode active material A. In other words, the mass ratio of graphite particles A:graphite particles B in the half region of the negative electrode active material layer on the outer surface side was 80:20, and the mass ratio of graphite particles A:graphite particles B in the half region of the negative electrode active material layer on the negative electrode current collector side was 0:100. A non-aqueous electrolyte secondary battery was produced using the resulting negative electrode of Example 3 in the same manner as in Example 1.

Example 4

A negative electrode was produced in the same manner as in Example 1 except that 95 parts by mass of graphite particles including 20 parts by mass of graphite particles A and 80 parts by mass of graphite particles B, and 5 parts by mass of SiO were mixed and the resulting mixture was used as negative electrode active material A. In other words, the mass ratio of graphite particles A:graphite particles B in the half region of the negative electrode active material layer on the outer surface side was 20:80, and the mass ratio of graphite particles A:graphite particles B in the half region of the negative electrode active material layer on the negative electrode current collector side was 0:100. A non-aqueous electrolyte secondary battery was produced using the resulting negative electrode of Example 4 in the same manner as in Example 1.

Comparative Example 1

Mixed were 95 parts by mass of graphite particles B and 5 parts by mass of SiO, and the resulting mixture was adopted as negative electrode active material C to be included in the entire region of the negative electrode active material layer. Negative electrode active material C, carboxymethyl cellulose (CMC), and styrene-butadiene copolymer rubber (SBR) were mixed such that the mass ratio thereof was 100:1:1, to thereby prepare a negative electrode mixture slurry. After both sides of a negative electrode current collector made of copper foil were coated with the negative electrode mixture slurry, by a doctor blade method, and the resulting coatings were dried, the coatings were rolled by a roller to thereby produce a negative electrode in which a negative electrode active material layer was formed on each of both sides of the negative electrode current collector. In other words, the mass ratio of graphite particles A:graphite particles B in the half region of the negative electrode active material layer on the outer surface side was 0:100, and the mass ratio of graphite particles A:graphite particles B in the half region of the negative electrode active material layer on the negative electrode current collector side was 0:100. A non-aqueous electrolyte secondary battery was produced using the resulting negative electrode of Comparative Example 1 in the same manner as in Example 1.

Comparative Example 2

A negative electrode was produced in the same manner as in Comparative Example 1 except that 95 parts by mass of graphite particles including 25 parts by mass of graphite particles A and 75 parts by mass of graphite particles B, and 5 parts by mass of SiO were mixed and the resulting mixture was used as negative electrode active material C. In other words, the mass ratio of graphite particles A:graphite particles B in the half region of the negative electrode active material layer on the outer surface side was 25:75, and the mass ratio of graphite particles A:graphite particles B in the half region of the negative electrode active material layer on the negative electrode current collector side was 25:75. A non-aqueous electrolyte secondary battery was produced using the resulting negative electrode of Comparative Example 2 in the same manner as in Example 1.

Comparative Example 3

A negative electrode was produced in the same manner as in Comparative Example 1 except that 95 parts by mass of graphite particles A and 5 parts by mass of SiO were mixed and the resulting mixture was used as negative electrode active material C. In other words, the mass ratio of graphite particles A:graphite particles B in the half region of the negative electrode active material layer on the outer surface side was 100:0, and the mass ratio of graphite particles A:graphite particles B in the half region of the negative electrode active material layer on the negative electrode current collector side was 100:0. A non-aqueous electrolyte secondary battery was produced using the resulting negative electrode of Comparative Example 3 in the same manner as in Example 1.

Comparative Example 4

A negative electrode was produced in the same manner as in Example 1 except that graphite particles B were used instead of graphite particles A in negative electrode active material A and graphite particles A were used instead of graphite particles B in negative electrode active material B. In other words, the mass ratio of graphite particles A:graphite particles B in the half region of the negative electrode active material layer on the outer surface side was 0:100, and the mass ratio of graphite particles A:graphite particles B in the half region of the negative electrode active material layer on the negative electrode current collector side was 100:0. A non-aqueous electrolyte secondary battery was produced using the resulting negative electrode of Comparative Example 4 in the same manner as in Example 1.

Comparative Example 5

A negative electrode was produced in the same manner as in Comparative Example 1 except that 95 parts by mass of graphite particles including 50 parts by mass of graphite particles A and 50 parts by mass of graphite particles B, and 5 parts by mass of SiO were mixed and the resulting mixture was used as negative electrode active material C. In other words, the mass ratio of graphite particles A:graphite particles B in the half region of the negative electrode active material layer on the outer surface side was 50:50, and the mass ratio of graphite particles A:graphite particles B in the half region of the negative electrode active material layer on the negative electrode current collector side was 50:50. A non-aqueous electrolyte secondary battery was produced using the resulting negative electrode of Comparative Example 5 in the same manner as in Example 1.

[Measurement of Capacity Retention Rate in Rapid Charge Cycle]

Each of the non-aqueous electrolyte secondary batteries of Examples and Comparative Examples was charged to 4.2 V at a constant current of 1 C (4600 mA) and then charged to 1/50 C at a constant voltage of 4.3 V at an environmental temperature of 25° C. Thereafter, such each battery was discharged to 2.5 V at a constant current of 0.5 C. Such charge and discharge were defined as one cycle, and performed for 300 cycles. The capacity retention rate in the rapid charge cycle of each of the non-aqueous electrolyte secondary batteries of Examples and Comparative Examples was determined according to the following expression.

Capacity retention rate=(Discharge capacity at $300^{th}$ cycle/Discharge capacity at $1^{st}$ cycle)×100

The results with respect to the capacity retention rate in the rapid charge cycle of each of the non-aqueous electrolyte secondary batteries of Examples and Comparative Examples were summarized in Table 1. It was indicated that, as the value of the capacity retention rate in the rapid charge cycle was higher, deterioration in rapid charge cycle characteristics was suppressed.

TABLE 1

| | Negative electrode active material layer | | Battery characteristics Capacity retention rate in rapid charge cycle |
|---|---|---|---|
| | Mass ratio between graphite particles A and B in half region on outer surface side | Mass ratio between graphite particles A and B in half region on negative electrode current collector side | |
| Example 1 | A:B = 100:0 | A:B = 0:100 | 82% |
| Example 2 | A:B = 50:50 | A:B = 0:100 | 85% |
| Example 3 | A:B = 80:20 | A:B = 0:100 | 84% |
| Example 4 | A:B = 20:80 | A:B = 0:100 | 78% |
| Comparative Example 1 | A:B = 0:100 | A:B = 0:100 | 70% |
| Comparative Example 2 | A:B = 25:75 | A:B = 25:75 | 73% |
| Comparative Example 3 | A:B = 100:0 | A:B = 100:0 | 60% |
| Comparative Example 4 | A:B = 0:100 | A:B = 100:0 | 54% |
| Comparative Example 5 | A:B = 50:50 | A:B = 50:50 | 72% |

As clear from Table 1, Examples 1 to 4 each exhibited an enhanced capacity retention rate in the rapid charge cycle as compared with Comparative Examples 1 to 5. Accordingly, deterioration in rapid charge cycle characteristics can be suppressed by using a negative electrode active material including graphite particles A having a porosity due to closed pores of 5% or less and graphite particles B having a porosity due to closed pores of 8% to 20% and allowing the graphite particles A to be more included in a half region on an outer surface side than in a half region on a negative electrode current collector side in the case of bisection of a negative electrode active material layer in a thickness direction.

REFERENCE SIGNS LIST 10 non-aqueous electrolyte secondary battery
11 positive electrode
12 negative electrode
13 separator 14 electrode assembly
15 battery case
16 case body
17 sealing assembly
18, 19 insulating plate
20 positive electrode lead
21 negative electrode lead
22 projecting portion
23 filter
24 lower vent member
25 insulating member
26 upper vent member
27 cap
28 gasket
30 graphite particle
34 closed pore
36 open pore
40 negative electrode current collector
42 negative electrode active material layer
42*a* half region on negative electrode current collector side
42*b* half region on outer surface side.

The invention claimed is:

1. A non-aqueous electrolyte secondary battery comprising:
   a positive electrode including a positive electrode current collector and a positive electrode active material layer disposed on the positive electrode current collector, wherein the positive electrode active material includes a lithium/transition metal oxide containing lithium and a transition metal element,
   a negative electrode including a negative electrode current collector and a negative electrode active material layer disposed on the negative electrode current collector, and
   a non-aqueous electrolyte, wherein
   the non-aqueous electrolyte includes a non-aqueous solvent, and an electrolyte salt dissolved in the non-aqueous solvent, and
   the non-aqueous solvent includes fluoroethylene carbonate; wherein
   the negative electrode active material layer includes graphite particles A and graphite particles B each as a negative electrode active material, wherein the graphite particles A and the graphite particles B are configured to reversibly intercalate and deintercalate lithium ions,
   the graphite particles A have a porosity due to closed pores of 5% or less and the graphite particles B have a porosity due to closed pores of 8% to 20%, wherein the porosity due to closed pores is an average percentage of a total area of closed pores relative to a cross sectional area of each of the graphite particles A and the graphite particles B, wherein the closed pores are not linked from internals of a graphite particle to an external surface of the graphite particle, and
   the graphite particles A are more included in a half region on an outer surface side than in a half region on a negative electrode current collector side in the case of bisection of the negative electrode active material layer in a thickness direction.

2. The non-aqueous electrolyte secondary battery according to claim 1, wherein a mass ratio between the graphite particles A and the graphite particles B in the half region on the outer surface side is 20:80 to 100:0.

3. The non-aqueous electrolyte secondary battery according to claim 1, wherein the negative electrode active material includes a Si material.

4. The non-aqueous electrolyte secondary battery according to claim 1, wherein at least a portion of surfaces of the graphite particles A is covered with amorphous carbon.

5. The non-aqueous electrolyte secondary battery according to claim 1, wherein
   a plane spacing ($d_{002}$) of the (002) plane with respect to the graphite particles A and B according to a wide-angle X-ray diffraction method is 0.3354 nm or more and less than 0.340 nm.

6. The non-aqueous electrolyte secondary battery according to claim 1, wherein
   a crystallite size (Lc(002)) with respect to the graphite particles A and B as determined according to an X-ray diffraction method is 5 nm or more and 300 nm or less.

* * * * *